United States Patent
Matt (10) Patent No.: US 11,161,399 B2
(45) Date of Patent: Nov. 2, 2021

(54) AXLE DRIVE UNIT COMPRISING AN INDUCTIVE CHARGING RECEIVER, DRIVE AXLE AND MOTOR VEHICLE

(71) Applicant: JHEECO E-DRIVE AG, St. Gallen (CH)

(72) Inventor: Philipp Matt, Frastanz (AT)

(73) Assignee: JHEECO E-DRIVE AG, Eschen (LI)

( * ) Notice: Subject to any disclaimer, the term of this patent is extended or adjusted under 35 U.S.C. 154(b) by 167 days.

(21) Appl. No.: 16/486,767

(22) PCT Filed: Feb. 16, 2018

(86) PCT No.: PCT/EP2018/053958
§ 371 (c)(1),
(2) Date: Aug. 16, 2019

(87) PCT Pub. No.: WO2018/150010
PCT Pub. Date: Aug. 23, 2018

(65) Prior Publication Data
US 2019/0375305 A1     Dec. 12, 2019

(30) Foreign Application Priority Data

Feb. 20, 2017  (DE) ...................... 10 2017 103 397.1
Feb. 20, 2017  (DE) ...................... 10 2017 103 399.8
(Continued)

(51) Int. Cl.
*H02K 7/00*   (2006.01)
*H02K 7/116*  (2006.01)
(Continued)

(52) U.S. Cl.
CPC ................ *B60K 1/00* (2013.01); *B60K 1/04* (2013.01); *B60K 7/0007* (2013.01); *B60L 53/24* (2019.02);
(Continued)

(58) Field of Classification Search
CPC ................ B60K 1/00; B60K 2001/006; B60K 2007/0061; B60K 2023/043; B60K 1/04;
(Continued)

(56) References Cited

U.S. PATENT DOCUMENTS 5,412,304 A    5/1995  Abbott
9,022,168 B2   5/2015  Hayman
(Continued)

FOREIGN PATENT DOCUMENTS

DE     694 02 635 T    11/1997
DE     10219921 A      11/2003
(Continued)

OTHER PUBLICATIONS

Festo Didactic Co., "Electricity and New Energy, Three-Phase PWM Rectifier/Inverter", Dec. 2015.*
(Continued)

*Primary Examiner* — John K Kim
(74) *Attorney, Agent, or Firm* — Calfee, Halter & Griswold LLP (57) ABSTRACT

An axle drive unit may be employed by an electrically-driven motor vehicle having at least one drive axle. The axle drive unit may have at least one electric motor for generating a drive torque and at least one gearing (or transmission) for transmitting the drive torque to the drive axle. The electric motor and the gearing may form a structural unit. In short, the axle drive unit allows a drive train of a motor vehicle to have the simplest, weight-saving construction possible. Power electronics and an inductive charging receiver for a battery system may be integrated into the structural unit. The power electronics may be electrically connected to the inductive charging receiver and may be tuned to rectify an alternating voltage that can be induced in the inductive charging receiver.

10 Claims, 5 Drawing Sheets

US 11,161,399 B2
Page 2

(30) Foreign Application Priority Data

Feb. 20, 2017 (DE) .................. 10 2017 103 400.5
Feb. 20, 2017 (DE) .................. 10 2017 103 401.3

(51) Int. Cl.

| | |
|---|---|
| H02K 9/19 | (2006.01) |
| H02K 11/00 | (2016.01) |
| H02K 11/22 | (2016.01) |
| H02K 11/33 | (2016.01) |
| B60K 1/00 | (2006.01) |
| B60K 1/04 | (2019.01) |
| B60K 7/00 | (2006.01) |
| H02J 50/10 | (2016.01) |
| B60L 53/24 | (2019.01) |
| H02J 7/02 | (2016.01) |
| B60K 11/02 | (2006.01) |
| B60K 17/04 | (2006.01) |

(52) U.S. Cl.
CPC .............. *H02J 7/025* (2013.01); *H02J 50/10* (2016.02); *H02K 7/006* (2013.01); *H02K 7/116* (2013.01); *H02K 9/19* (2013.01); *H02K 11/0094* (2013.01); *H02K 11/33* (2016.01); *B60K 11/02* (2013.01); *B60K 17/043* (2013.01); *B60K 2001/001* (2013.01); *B60K 2007/0046* (2013.01); *B60K 2007/0092* (2013.01); *B60L 2210/10* (2013.01); *B60Y 2410/10* (2013.01)

(58) Field of Classification Search
CPC .......... B60K 7/0007; B60K 2007/0092; B60K 11/02; B60K 17/043; B60K 2001/001; B60K 2007/0046; H02K 11/33; H02K 7/006; H02K 7/116; H02K 9/19; H02K 11/0094; H02J 50/10; H02J 7/025; B60L 1/02; B60L 2240/36; B60L 2240/425; B60L 53/24; B60L 2210/10; B60Y 2410/10; B60Y 2400/61; Y02T 90/14; Y02T 10/7072; Y02T 10/70; Y02T 10/64; F16D 2121/24; F16D 65/853; B60T 1/10; B60T 5/00; B60T 1/062
USPC .......................................................... 310/54
See application file for complete search history.

(56) References Cited

U.S. PATENT DOCUMENTS

| | | | | |
|---|---|---|---|---|
| 9,381,878 | B2 * | 7/2016 | Ichikawa | H02J 50/12 |
| 10,003,217 | B2 * | 6/2018 | Kuerschner | B60L 53/126 |
| 10,146,647 | B2 * | 12/2018 | Halker | B60L 53/66 |
| 10,166,875 | B2 * | 1/2019 | Ricci | H02J 50/70 |
| 10,324,226 | B2 * | 6/2019 | Widmer | G01V 9/005 |
| 2003/0230443 | A1 | 12/2003 | Cramer | |
| 2007/0213160 | A1 | 9/2007 | Lyons | |
| 2011/0231067 | A1 * | 9/2011 | Itoga | B60R 21/0134 |
| | | | | 701/46 |
| 2013/0015812 | A1 * | 1/2013 | Boyer | H02J 50/12 |
| | | | | 320/108 |
| 2013/0249477 | A1 | 9/2013 | Keeling | |
| 2013/0281247 | A1 | 10/2013 | Holmes | |
| 2015/0102684 | A1 * | 4/2015 | Tanaka | B60L 53/36 |
| | | | | 307/104 |
| 2016/0003337 | A1 | 1/2016 | Smetana | |
| 2016/0039277 | A1 | 2/2016 | Falls | |
| 2016/0159227 | A1 | 6/2016 | Lochner | |
| 2016/0297306 | A1 | 10/2016 | Herzog | |
| 2017/0210244 | A1 | 7/2017 | Isono | |
| 2018/0194236 | A1 * | 7/2018 | Elshaer | H02J 7/00034 |
| 2018/0354339 | A1 * | 12/2018 | Smith | B60H 1/00278 |
| 2019/0341810 | A1 * | 11/2019 | Bae | H02J 50/60 |
| 2019/0375283 | A1 * | 12/2019 | Matt | B60K 1/04 |
| 2019/0375305 | A1 * | 12/2019 | Matt | B60K 1/00 |

FOREIGN PATENT DOCUMENTS

| | | |
|---|---|---|
| DE | 103 38 659 A | 3/2005 |
| DE | 102007000653 A | 5/2009 |
| DE | 10 2009 015 414 A | 9/2010 |
| DE | 20 2011 002 194 U | 4/2011 |
| DE | 102010008230 A | 8/2011 |
| DE | 10 2010 017 991 A | 10/2011 |
| DE | 10 2010 020 576 A | 11/2011 |
| DE | 10 2011 001 481 A | 6/2012 |
| DE | 10 2012 208 927 A | 12/2013 |
| DE | 10 2012 112 377 A | 6/2014 |
| DE | 10 2012 025 371 A | 7/2014 |
| DE | 10 2013 100 957 A | 7/2014 |
| DE | 20 2014 004 853 U | 7/2014 |
| DE | 10 2013 012 477 A | 1/2015 |
| DE | 10 2013 214 311 A | 1/2015 |
| DE | 10 2013 226 830 A | 6/2015 |
| DE | 10 2014 203 037 A | 8/2015 |
| DE | 10 2014 018 753 A | 6/2016 |
| DE | 10 2015 206 365 A | 10/2016 |
| DE | 10 2015 208 834 A | 12/2016 |
| DE | 10 2015 212 811 A | 1/2017 |
| EP | 1 503 481 A | 2/2005 |
| EP | 2 258 569 A | 12/2010 |
| EP | 2 546 092 A | 1/2013 |
| EP | 2765018 A | 8/2014 |
| EP | 2849314 A | 3/2015 |
| KR | 20090123063 A | 12/2009 |
| KR | 20150142652 A | 12/2015 |
| WO | 99/36286 A | 7/1999 |
| WO | 2011/076534 A | 6/2011 |
| WO | 2013/106049 A | 7/2013 |
| WO | 2016055873 A | 4/2016 |
| WO | 2016/116104 A | 7/2016 |

OTHER PUBLICATIONS

English Translation of International Search Report issued in PCT/EP2018/053958, dated Jul. 19, 2018.
Anwendungsrichtlinie VDE, Mar. 2011, VDE AR 2122-4.

* cited by examiner

AXLE DRIVE UNIT COMPRISING AN INDUCTIVE CHARGING RECEIVER, DRIVE AXLE AND MOTOR VEHICLE

CROSS REFERENCE TO RELATED APPLICATIONS

This application is a U.S. National Stage Entry of International Patent Application Serial Number PCT/EP2018/053958, filed Feb. 16, 2018, which claims priority to (i) German Patent Application No. DE 10 2017 103 397.1, filed Feb. 20, 2017; (ii) German Patent Application No. DE 10 2017 103 399.8, filed Feb. 20, 2017; (iii) German Patent Application No. DE 10 2017 103 400.5, filed Feb. 20, 2017; and (iv) German Patent Application No. DE 10 2017 103 401.3, filed Feb. 20, 2017, the entire contents all of which are incorporated herein by reference.

FIELD

The present disclosure generally relates to axle drives for motor vehicles.

BACKGROUND

With a view to future mobility requirements, considerable technological changes are facing the automotive industry in connection with the electrification of the traction drive. Precisely the legal conditions for limiting the pollutant emissions and the $CO_2$ emission require new designs. For example, from 2021, passenger motor vehicles in Europe will be allowed to emit on average only 95 g $CO_2$/km. The increasing electrification of the drive train plays an important role in maintaining this limit and also in maintaining other emission limits.

WO 2016/116104 A1, stated at the outset, discloses an axle drive unit having an electric motor and a gearing. In this known axle drive unit, the gearing is intended to improve the shifting comfort and efficiency of the unit. For this purpose, the gearing has two shifting stages with an intermediate gearing which has an infinitely variable transmission. In addition, the known axle drive unit comprises an integrated electromechanical parking lock. The intermediate gearing makes the known axle drive unit structurally complicated and relatively heavy, with the result that the weight of the drive train is increased.

Thus a need exists for an axle drive unit that allows a drive train of a motor vehicle to have the simplest, weight-saving construction possible.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention is based on the concept of providing an axle drive unit for an electrically drivable motor vehicle which comprises at least one drive axle. The axle drive unit comprises at least one electric motor for generating a drive torque and at least one gearing for transmitting the drive torque to the drive axle. The electric motor and the gearing form a structural unit. The invention is distinguished by the fact that a power electronics units and an inductive charging receiver for a battery system are integrated into the structural unit. Here, the power electronics unit is electrically connected to the inductive charging receiver and adapted in such a way as to rectify an alternating voltage which can be induced in the inductive charging receiver.

Within the context of the invention, the power electronics unit is integrated, in addition to the electric motor and the gearing, into the structural unit built up from these components, that is to say into one and the same structural unit. The power electronics unit is adapted in such a way as to supply the at least one electric motor of the axle drive unit with current and in addition preferably to control said electric motor.

Moreover, in addition to the power electronics unit, an inductive charging receiver is integrated as further component into the structural unit. The structural unit forms a physical unit in which the aforementioned components are combined as a subassembly. The structural unit can be handled as a whole, for example can be assembled as a whole during assembly of the drive axle. In the installed state, the structural unit forms the interface to other components of the motor vehicle which are arranged outside the structural unit and with which the individual components of the structural unit interact, for example a traction battery of the motor vehicle which is part of a battery system, or a generator.

The integration of the aforementioned components into the structural unit contributes to the drive train being able to be optimized overall, for example in terms of the weight of the axle drive unit, since the periphery of these components can be optimally configured by the common, central use of already existing components. In addition, the integration of the components into one and the same structural unit allows a reduction in the number of holding points by which said components are fastened in the chassis, with the result that assembly is simplified.

In summary, the invention allows a highly integrated, electric drive axle in which the axle drive unit contains the aforementioned components as integral constituent parts in addition to the known components, i.e. electric motor and gearing. The integration in a structural unit of the components, which are installed separately in the prior art, allows the realization of synergy effects which lead to a simple and lightweight construction of the drive train. The specific implementation of the synergy effects is the subject matter of the preferred embodiments of the invention.

The invention is suitable for all motor vehicles, i.e. for example passenger motor vehicles or commercial motor vehicles, in which an electric drive axle is installed. The invention is particularly well suited to exclusively battery-operated vehicles. The latter can be equipped with or without range extenders. The invention can also be used for hybrid vehicles which have an electrified drive axle.

It is possible to use the axle drive unit according to the invention in an electrified front axle and/or in an electrified rear axle.

Within the scope of the invention, the axle drive unit is claimed independently of the drive axle. Additionally claimed is the combination of the drive axle with the axle drive unit according to the invention and a motor vehicle which contains the axle drive unit according to the invention.

Preferred embodiments of the invention are specified in the dependent claims.

The drive torque is preferably transmitted by in each case one axle drive unit to at least two drive shafts, also termed drive axles, in order to drive wheels of the motor vehicle.

Precisely one axle drive unit is particularly preferably provided for in each case two drive axles.

Here, it is particularly to be preferred if, as viewed with respect to the axle drive unit, the two axles are arranged on opposite sides of the axle drive unit. In other words, in each case a right and a left wheel of the motor vehicle is driven and, if correspondingly integrated, also steered by the axle drive unit.

In a particularly preferred embodiment, the structural unit comprises a common housing. This has the advantage that the housing can be designed as a multifunctional component which centrally performs different functions, such as, for example, cooling or coupling to an energy supply, for the components arranged in the housing. Likewise, the power electronics unit, on the one hand, and an electromechanical service brake system and/or an electromechanical steering system and/or an inductive charging receiver for a battery system, on the other hand, just like elements thereof, such as, for example brakes of the service brake system, can be built and/or flanged on/in the structural unit and/or the housing.

It has also been found to be advantageous for the inductive charging receiver to comprise at least one coil which is arranged on the lower side and within the housing. As a result, the charging receiver is protected from contamination and weather influences. In addition, the coil (secondary coil or receiver coil) is positioned directly above the traveling plane of the motor vehicle and has a small distance during charging from a transmitter coil (primary coil) which can be arranged either below, in or on the traveling plane. This increases the efficiency of the transmitted magnetic alternating field of the primary coil to the secondary coil, which alternating field induces an alternating voltage in the secondary coil.

At least a part of the housing lower side above which the at least one coil is arranged is preferably designed as a field-guiding element for magnetic alternating fields. This has the advantage of guiding the magnetic field for example onto the coil and/or onto a magnetic field sensor of the charging receiver and/or of guiding it away, in particular keeping it away or shielding it, from other components of the structural unit which would be disturbed by the magnetic field or have no use for the magnetic field.

It is also advantageous if at least a part of the housing lower side above which at least one coil is arranged is designed in the form of a shield and, in particular, concavely. This is a specific embodiment of the field-guiding property of the housing lower side through this design.

A further specific embodiment of the housing is obtained by the material selection of the housing lower side which allows better guidance and transmission with small loses of the magnetic field. Here, additionally or alternatively, at least a part of the housing lower side above which the at least one coil is arranged consists of an aluminum alloy with a 40 percent content by volume of ferrite. This material has low magnetic reversal losses and thus does not heat up significantly, with the result that the components of the axle drive unit are protected from overheating.

The inductive charging receiver is preferably adapted for magnetic alternating fields in the frequency range of at least 10 kHz, in particular 80 kHz or 140 kHz. Higher frequencies of the magnetic field make higher transmission powers to the receiver coil possible for the same area and flux density. A nominal frequency of 140 kHz, which is recommended for the inductive charging of electric vehicles, is also specified in accordance with the German application Guidelines VDE, 2011-03, VDE AR 2122-4.

In a further preferred embodiment, the electric motor and the inductive charging receiver are in each case liquid-cooled, and the axle drive unit comprises a device for supplying cooling liquid to the electric motor and to the inductive charging receiver. This ensures a disturbance-free operation and protection from damage by overheating of said components. In addition, a central unit which supplies a plurality of components is provided by means of the device for cooling liquid supply, and space is thus saved. The integration of the aforementioned components into a structural unit offers the possibility of a central cooling liquid supply, with the result that the cooling liquid supply required for the electric motor is also made usable for other components. This is particularly advantageous because the cooling water feed of the electric motor is generally about 65° C.

Furthermore, it has been found to be advantageous if the structural unit, in particular the housing, preferably has connections for the connection of the device for cooling liquid supply to an external cooling liquid circuit and/or an internal cooling liquid circuit. This has the advantage of connecting any cooling units arranged outside the axle drive unit or of channeling the cooling liquid out and/or into the axle drive unit. In the first variant (external cooling liquid circuit), the heat absorbed by the cooling liquid is removed outside the structural unit. For this purpose, the cooling liquid is channeled in from outside and channeled off again to the outside after the cooling liquid has passed through the components to be cooled. In the second variant (internal cooling liquid circuit), what is concerned is a closed cooling liquid circuit within the structural unit. This has the advantage that the structural unit can be encapsulated.

The power electronics unit is preferably adapted, in the driving mode, as an inverter between battery system and electric motor and, in the charging mode, as a rectifier between the inductive charging receiver and the battery system. The concentrated collection of functions in the power electronics unit makes possible a relatively compact structure and a relatively small size of the axle drive unit.

In a further preferred embodiment, the power electronics unit comprises a high-voltage/low-voltage DC/DC converter and/or two separate electric connections (for example of 12 volts), in particular for the low-voltage supply of a vehicle on-board power supply network. Here, the high voltage of the battery system is transformed down by said converter and can be used for the electrical supply of components of the axle drive unit and/or of the vehicle on-board power supply network.

Besides the features stated in the dependent claims, further preferred embodiments of the axle drive unit are provided which additionally or alternatively comprise the features explained below.

In addition to electric motor, gearing, inductive charging receiver and power electronics unit, components which are responsible, with a service brake system and/or with a steering system, for the longitudinal dynamics and for the transverse dynamics of the motor vehicle are integrated into the structural unit. The integration of the service brake system and/or the steering system into one and the same structural unit with the electric motor, the gearing and the power electronics unit ensures a high functional and physical integration of the relevant longitudinal and transverse dynamics components into a central unit.

The service brake system can comprise at least one service brake with at least one mechanical braking element for the transmission of the braking force and at least one electrically actuatable actuator for the braking element. The service brake can be configured for example as a friction brake, in particular as a wedge brake. The invention is not limited to wedge brakes but also encompasses other electromechanically actuatable service brakes.

In a preferred embodiment, the service brake system and the electric motor can be selectively or simultaneously activated to decelerate the motor vehicle. As described above, the electric motor can be operated as a generator for recuperation of the braking energy. The electric motor/generator thus acts as a permanent brake system. By virtue of the integrated drive control kit, the vehicle deceleration controller selectively brings the electric motor and/or the electromechanical brake into use in dependence on the predetermined command variable and the operating state of the electrified drive axle.

The service brake system preferably comprises two service brakes which are designed for transmitting wheel-specific braking torques to the drive axle. A redundant safety system is thereby created for the case that one of the two service brake fails. In addition, by virtue of the transmission of wheel-specific braking torques, the two service brakes can be used for the distribution of the driving torques to the different wheels (torque vectoring).

Furthermore, it is advantageous if the structural unit comprises a central motor with gearing and corresponding differential, and the service brake system comprises wheel-specific inboard brakes for the use of torque vectoring.

For drive torque distribution, use can be made either of a differential gearing or of a split drive axle.

The steering system can be designed as a steering-knuckle steering system or as a single-wheel steering system. The steering-knuckle steering system is preferred if the steering system is used in conjunction with a design for drive torque distribution (torque vectoring).

In a further preferred embodiment, the power electronics unit is designed for controlling or supplying energy to the electric motor and for controlling or supplying energy to the electromechanical service brake system and/or the steering system. The central use of the power electronics unit for the common control or energy supply of a plurality of components in the structural unit forms the prerequisite for improved control performance, since the control of the different components of the structural unit, for example the electric motor and the service brake system, can be tailored to one another (blending). During braking in conjunction with an electrified drive train, consideration should be taken of the possibility of recuperation in which the braking power is used to drive the electric motor in order to use the latter as a generator. The traction battery or a low-voltage battery is charged with the thus generated electric energy. The distribution of the braking force to the electromechanical service brake system and to the electric motor acting as generator is referred to as blending. Moreover, the power electronics unit can additionally take over the control of the electric motor and of the steering system in order to tailor them to one another. This is particularly advantageous when a plurality of electric motors within a design for the different distribution of the drive torque to the wheels (torque vectoring) superimpose the steering movement or forms a fallback level for the case that the steering system fails.

With regard to the power electronics unit, a system integration close to the motor is preferably used to avoid output-side EMC filters. Use can also be made of an extinguishing switching method of the torque vectoring units to reduce the intermediate circuit capacitance. Current sensors can be integrated into the semiconductor structures of the power electronics unit, and the transistor semiconductor structures, in particular insulated gate bipolar transistor (IGBT), can comprise alternative or additional cooling structures.

With regard to the inductive charging receiver, there is alternatively provision to build it onto the housing of the axle drive unit for optional provision of the inductive charging.

Figure 1:
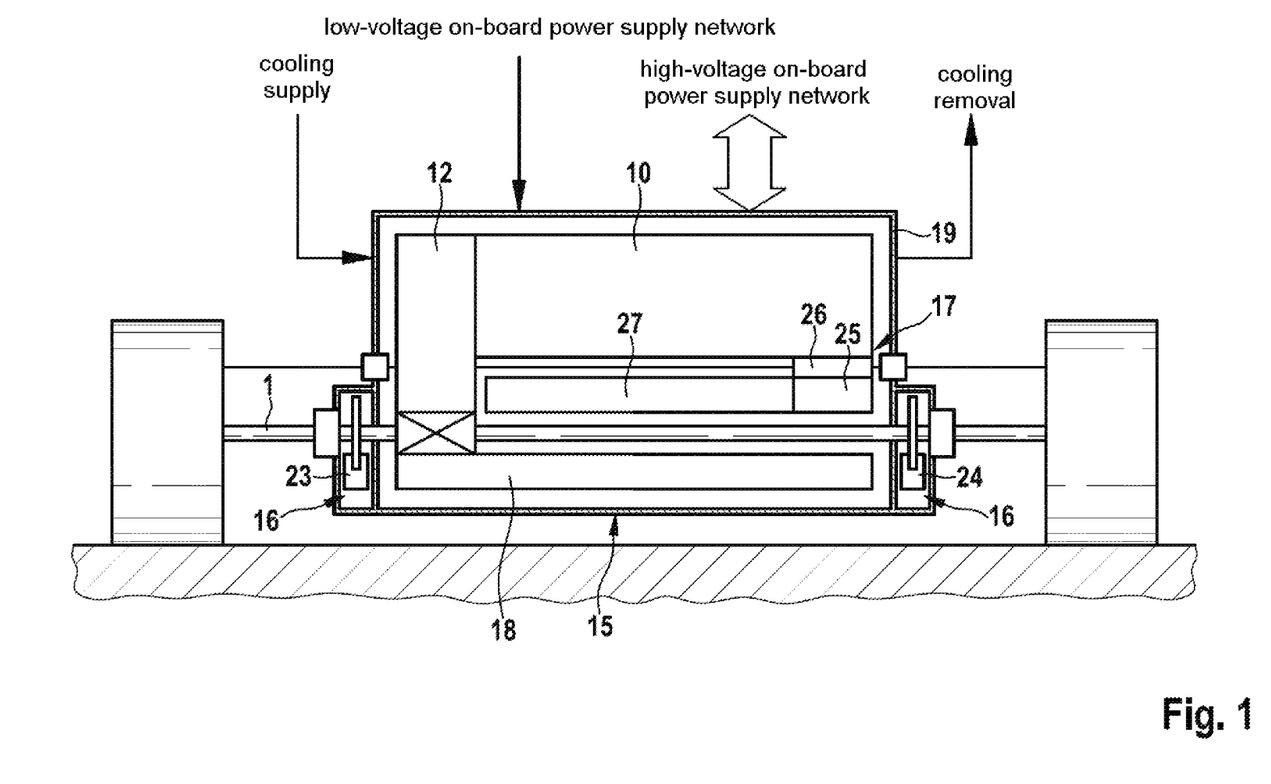
FIG. 1 is a cross-sectional view of an example axle drive unit with a single electric motor as a traction motor.

The axle drive unit according to FIG. 1 can be combined with the front axle and/or the rear axle of a motor vehicle. The same applies to the other exemplary embodiments. The axle drive unit is suitable for all motor vehicles, i.e. for example passenger motor vehicles or commercial motor vehicles, in which an electric drive axle is installed. The axle drive unit is suited particularly well, but not exclusively, for purely battery-operated vehicles. The axle drive unit can also be used for hybrid vehicles which have an electrified drive axle.

The axle drive unit according to FIG. 1 has a structural unit 15 into which different at least partially electric components are integrated. The components integrated into the structural unit 15 form a subassembly which mounted as a unit and interact with other components of the motor vehicle arranged outside the structural unit 15. For this purpose, the structural unit 15 comprises a common housing 19 in which the components belonging to the structural unit 15 are arranged or to which components of the structural unit 15 are fastened. It is thus possible that the components of the structural unit 19 are arranged both in the housing 19 and on the housing 19, i.e. on the outside of the housing 19.

The housing 19 is designed as a multifunctional housing which not only mechanically and thermally protects the components arranged therein but also allows the coupling of the components to devices and components of the motor vehicle situated outside the housing. For this purpose, the housing 19 comprises various devices, such as, for example, a cooling device or the power electronics unit 27, which are used centrally by the components arranged in or on the housing. Further functionalities of the housing 19 are possible.

The housing 19 is closed and heat-insulated for thermal management.

The structural unit 15 according to FIG. 1 comprises a single electric motor 10 as traction motor which generates the drive torque required for moving the motor vehicle. The drive torque generated by the electric motor 10 is stepped up by a gearing 12 and transmitted to the drive axle 1. The electric motor 10 and the gearing 12 are correspondingly connected to one another.

The electric motor 10 can be an asynchronous motor or a permanently excited synchronous motor. This applies to all the electric motors described within the context of the invention and to the associated exemplary embodiments.

The structural unit 15 comprises an electromechanical service brake system 16 which is arranged in the housing 19. The electromechanical service brake system 16 is controlled by an electric signal of the control signal transmission which is triggered for example by actuating the brake pedal or another actuating device. Here, the braking action can be changed by the vehicle driver during the driving mode. As a result, an electric output signal or actuating signal is generated which controls the mechanical components of the service brake system 16, for example the brake shoes or the brake wedge of a friction brake, with the result that the braking forces are transmitted to the drive axle. Specifically, the service brake system 16 comprises two service brakes 23, 24 which are arranged at a distance from the wheels in the longitudinal direction of the drive axle 1. The service brake system 16 is accordingly an inboard service brake system in which the braking forces are transmitted to the drive axle 1. Each service brake 23, 24 comprises an electrically actuatable actuator which exerts an actuating force on the respective mechanical braking elements and thus generates the desired braking forces.

As a possible, but not exclusive, example, the service brake can be configured in the form of a wedge brake. Here, the electrically actuatable actuator comprises an electric motor and a brake wedge which can be moved by the electric motor in two opposite directions, that is to say back and forth. The braking element is designed as a brake lining or brake pad which is pressed by the oblique surface of the brake wedge against a counterpiece, for example a brake disk which is connected to a wheel drive shaft of the drive axle in a rotationally fixed manner. As soon as the brake pad contacts the brake disk, the self-boosting effect of the wedge principle comes into play.

The two service brakes 23, 24 are designed as redundant safety systems for the case that one of the two service brakes 23, 24 fails. In addition, the the two service brakes 23, 24 can be activated wheel-specifically such that, as a result of different braking forces on the wheels, the driving torques acting there can be changed wheel-specifically. For this purpose, the axle drive unit can comprise a differential gearing (see FIG. 1) or can be able to be connected or be connected to a split drive axle 1 (see FIG. 2).

The two service brakes 23, 24 are encapsulated in the housing 19, which thus acts as a particle collector. Contamination of the rims by brake abrasion and fine dust loading is thus reduced. Nor can the brake abrasion be distributed in the housing 19, because the service brakes 23, 24 are also encapsulated inwardly, that is to say toward the housing 19.

The structural unit 15 according to FIG. 1 also comprises a steering system 17 with an electric motor 25. The electric motor 25 is mechanically connected to the wheels of the drive axle 1 by a steering gear 26 and a linkage.

The steering system 17 is preferably, but not exclusively, a steer-by-wire steering system, that is to say a steering system in which the steering wheel and the steering gear 26 are mechanically decoupled. The steering movement introduced into the steering wheel by the driver is detected by sensor. The sensor signal is processed in a controller which transmits an actuating signal to an actuating drive to set the desired steering angle of a steered wheel. The actuating drive can be the aforementioned electric motor 25 of the steering system 17. In order to simulate the actuating forces and reaction forces required for safe driving, a manual torque is introduced into the steering wheel by a further actuating member. By virtue of the mechanical decoupling of the steering wheel from the steering gear 26, it is possible to carry out automatic steering corrections or to realize autonomous driving without the steering wheel being moved for this purpose. The steer-by-wire steering system is an electromechanical steering system, since the steering torque generated by the electric motor 25 is transmitted to the wheels by a mechanical steering gear 26, for example a rack gear or a ball screw drive.

The electric motor 25 can also be designed as an auxiliary motor for assisting a mechanically generated steering torque. The steering system can be a steering-knuckle steering system or an individual-wheel steering system. The steering-knuckle steering system is preferable for the implementation of the drive torque distribution.

The mechanical components of the steering system 17 can be fastened, in particular flanged, to the outside of the housing 19. The mechanical components of the steering system 17 can be arranged on the housing 19 to the front or rear in the direction of travel. As a result, the respective installation position of the axle drive unit is taken into consideration. The electric motor 15 is arranged in the housing 19, with the result that the cooling and electrical activation of the electric motor 15 is facilitated.

In the lower region of the housing 19 there is arranged an inductive charging receiver 18 by means of which the traction battery can be charged during operation of the axle drive unit.

The following components of the structural unit are used centrally by the above-described components.

Integrated into the structural unit 15 is a power electronics unit 27 which controls the electric motor 10 and at least one further component of the structural unit 15. The power electronics unit 27 is responsible for transforming direct current into alternating current, or vice versa, and for controlling the power flows. Such devices are known in the prior art and do not need to be described in further detail. In the example according to FIG. 1, the power electronics unit 27 is additionally used to activate the steering system 17, the service brake system 16 and the inductive charging receiver 18. This has the advantage that the power control of the individual components, for example the electric motor and the service brake system 16, can be tailored (blending). In addition, the power electronics unit 27 can be concomitantly cooled centrally by the device for cooling liquid supply that is provided for the electric motor 10.

Besides the liquid-cooled electric motor 10, the device for cooling liquid supply (not shown) supplies further components of the structural unit 15 with cooling liquid, such as, for example, the service brake system 16, the electric motor 25, the steering system 17 and the charging receiver 18. The device for cooling liquid supply can, as illustrated in FIG. 1, comprise connections for the supply of the cooling liquid or the removal of the cooling liquid. The device for cooling liquid supply according to FIG. 1 can accordingly be connected to an external cooling liquid circuit. Alternatively, use can be made of a closed internal cooling liquid circuit which cools components arranged in the housing 19.

It is further illustrated in FIG. 1 that the housing 19 has connections for connection to a low-voltage on-board power supply network and a high-voltage on-board power supply network.

Figure 2:
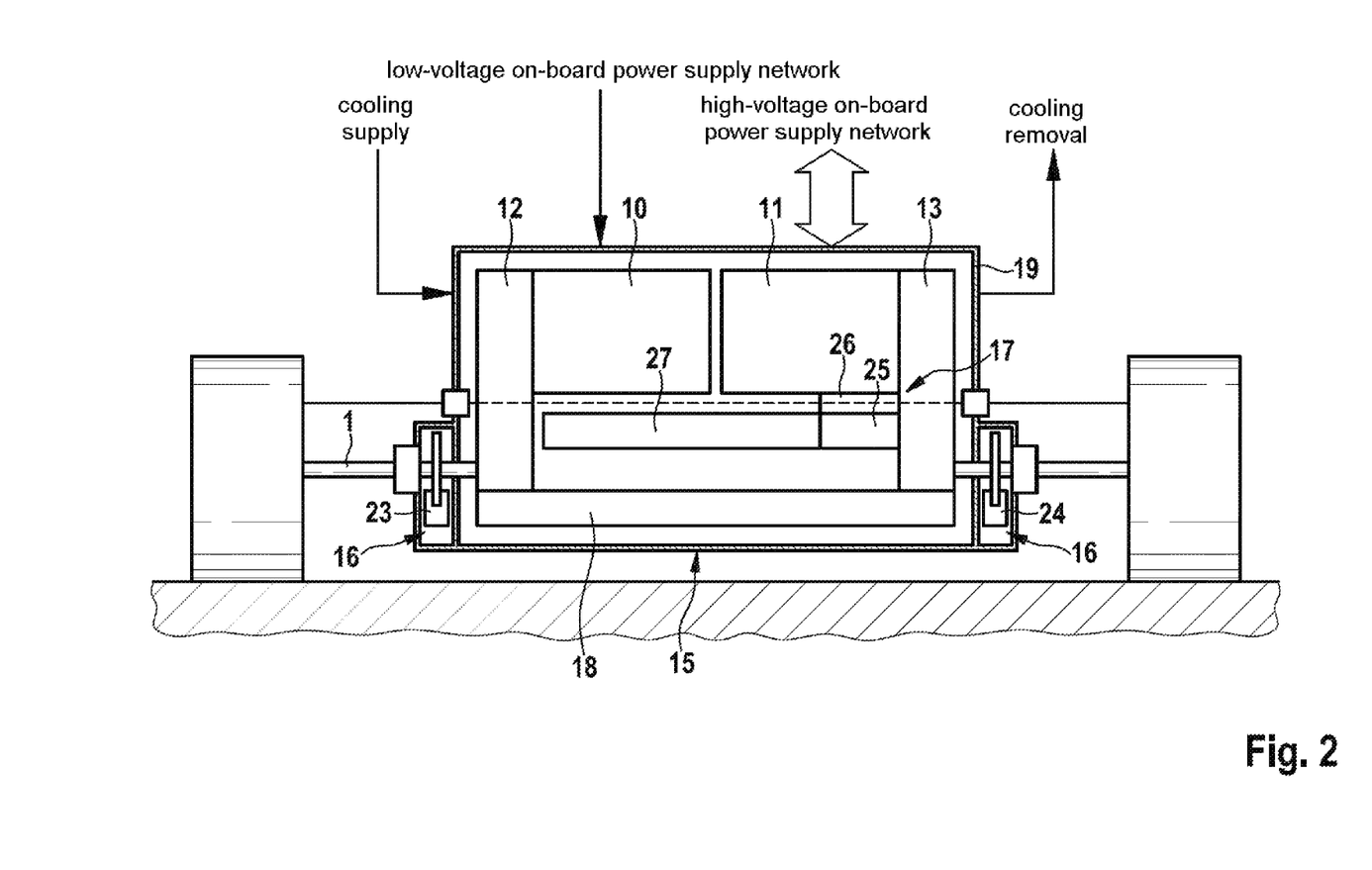
FIG. 2 is a cross-sectional view of another example axle drive unit with two electric motors as traction motors.

The exemplary embodiment according to FIG. 2 differs from the exemplary embodiment according to FIG. 1 in that, instead of the single electric motor 10, two separate electric motors 10, 11 (first and second electric motors 10, 11) are arranged as traction motors. To transmit wheel-specific drive torques by means of the two electric motors 10, 11, the drive axle 1 is split into two axle portions, wherein in each case an electric motor 10, 11 is connected to an axle portion by corresponding gearings 12, 13 (first and second gearings 12, 13). Alternatively, a differential gearing can be arranged between the two electric motors 10, 11.

As for the rest, reference is made to the statements in conjunction with the axle drive unit according to FIG. 1.

Figure 3:
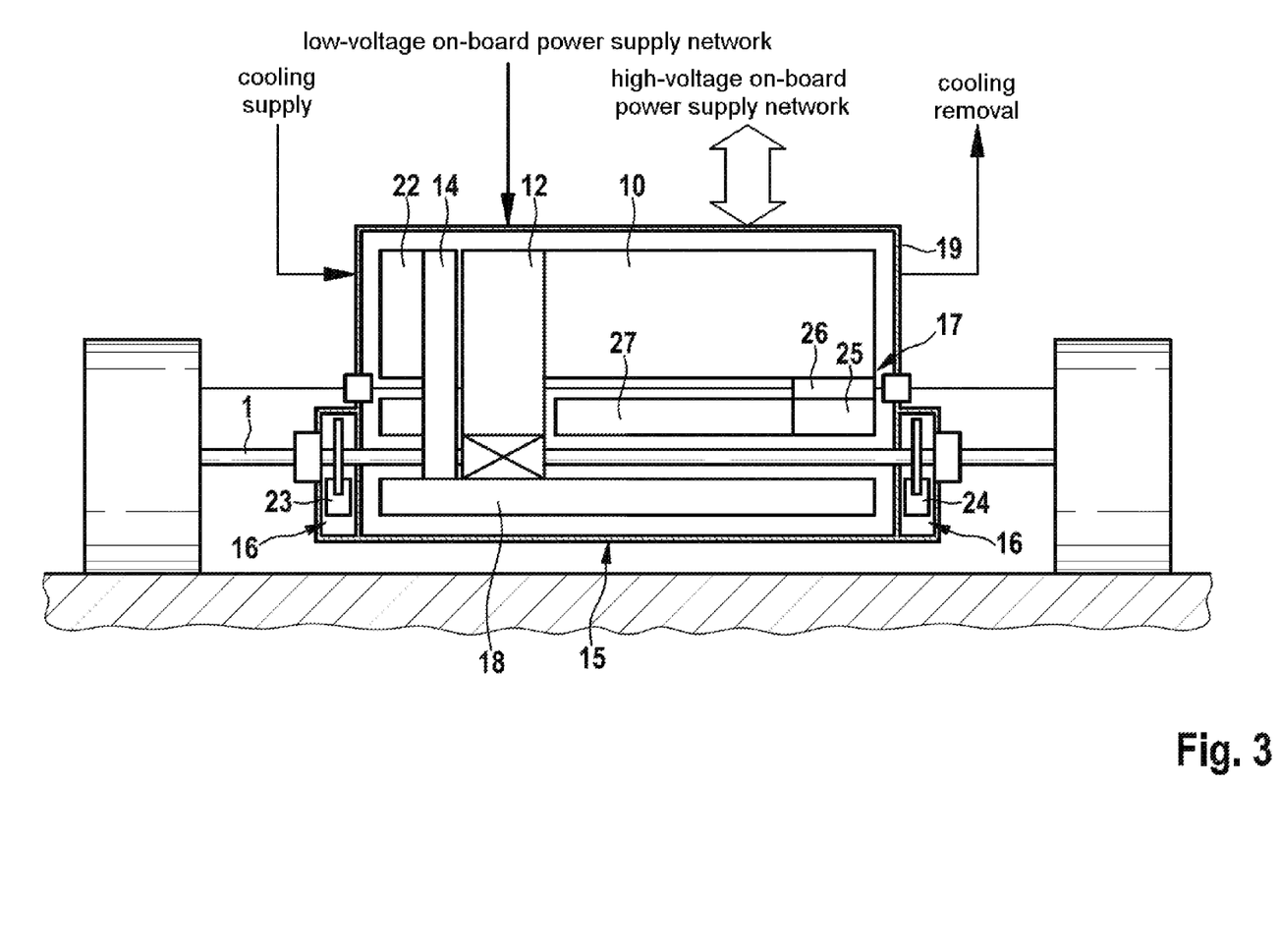
FIG. 3 is a cross-sectional view of yet another example axle drive unit with an auxiliary electric motor for distributing the axle drive torque.

The axle drive unit according to FIG. 3 is likewise suitable for transmitting different drive torques to the two wheels. The axle drive unit according to FIG. 3 comprises a single electric motor 10 as traction motor. The latter is connected to the drive axle 1 by the gearing 12, which is designed as a differential gearing. The differential gearing 12 produces a power splitting for transmitting different drive torques to the two wheels. The drive torque distribution is achieved by an auxiliary electric motor 22 (third electric motor) which is mechanically connected to the drive axle 1 by an additional (third) gearing 14. The drive torque applied by the electric motor 10 can be superimposed by the auxiliary electric motor 22, with the result that different drive torques can be applied to both wheels. The additional electric motor 22 and the associated third gearing 14 are accommodated in the housing 19 and are cooled by the central device for cooling liquid supply and supplied with energy by the central power electronics unit 27. As regards the rest of the components of the structural unit 15, reference is made to the statements pertaining to FIG. 1.

Figure 4:
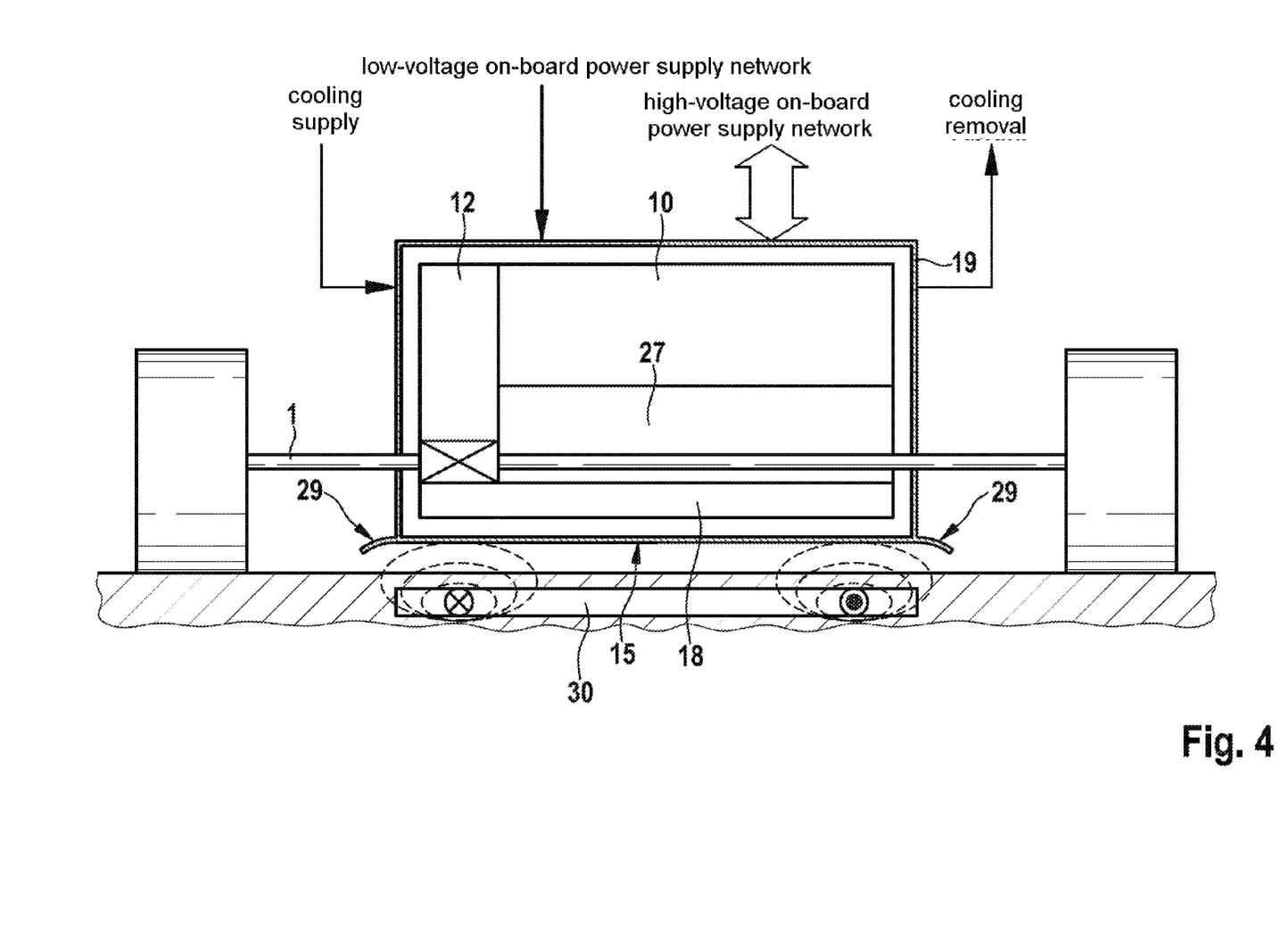
FIG. 4 is a cross-sectional view of still another example axle drive unit in which interaction of an inductive charging receiver and of a transmitter coil arranged below a traveling plane is illustrated.

FIG. 4 illustrates a charging mode of the motor vehicle. The axle drive unit according to FIG. 4 is constructed similarly to the axle drive unit according to FIG. 1, wherein the service brake system 16 and the steering system 17 are not illustrated. Below the axle drive unit there is arranged a transmitter system 30 with a transmitter coil below the vehicle plane, which system generates a magnetic alternating field and by means of which an alternating voltage is induced in the inductive charging receiver 18, in particular in its at least one coil.

In all the exemplary embodiments, the service brakes 23, 24 can be combined with the first and second electric motors 10, 11 acting as traction motors or with the single electric motor 10 and the auxiliary electric motor (third electric motor) in such a way that the service brake system 16 assists the drive torque distribution to the wheels. The electric motor 25 of the steering system 17 can be referred to as fourth electric motor.

Figure 5:
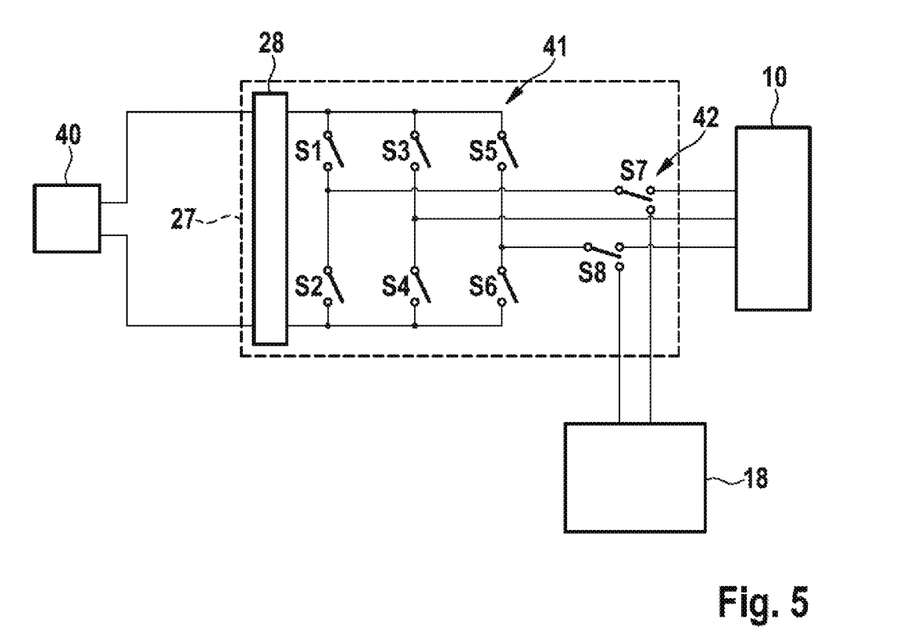
FIG. 5 is a circuit diagram of an example three-phase bridge circuit including a power electronics unit of an example axle drive unit, which is connected to a battery, an electric motor, and an inductive charging receiver.

FIG. 5 shows a circuit diagram of a three-phase bridge circuit 41 consisting of a power electronics unit 27 of a preferred axle drive unit, which is connected to a battery 40, an electric motor 10 and an inductive charging receiver 18. The circuit from FIG. 5 shows a basic design for the control and energy supply of the components indicated; that is to say that the power electronics units 27 can be realized with other, alternative or additional circuits, semiconductor structures and/or electric components. The power electronics unit 27 comprises a switching branch 42, a bridge circuit 41 and a synchronous converter 28 for bidirectional energy transmission between bridge circuit 41 and battery 40, which are connected in series. The bridge circuit 41 can be controlled via six switches S1 to S6 and serves, in the battery-motor direction, as an inverter and, in the motor-battery or charging receiver-battery direction, as a rectifier. The switches S1 to S6 are controlled via a respective pulse width modulation (PWM) signal and, in the inverter mode, generate three phase signals which are offset by 120 degrees from one another and electrically supply and drive the motor 10. In driving mode, the switches S7 and S8 of the switching branch 42 are connected to the motor 10 and, by contrast, in charging mode, to the inductive charging receiver 18. If the bridge circuit 41 is used as a rectifier, the vehicle is either in charging mode or in braking operation or recuperation. Here, the alternating current/voltage of the motor or of the charging receiver 18 is likewise rectified by a corresponding PWM signal present at the switches S1 to S6.

Figure 6:
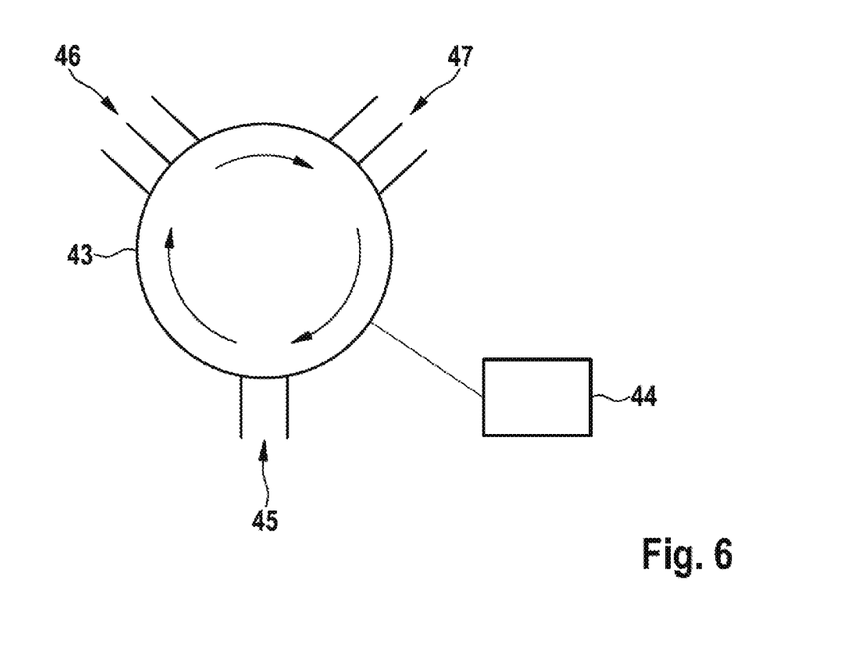
FIG. 6 is a circuit diagram of an example three-port device as rotor electronics unit including a power electronics unit of an example axle drive unit.

FIG. 6 shows a circuit diagram of a three-port device 43 as rotor electronics unit consisting of a power electronics unit of a preferred axle drive unit, which three-port device is alternatively used in the switching branch 42 in FIG. 5. The three-port device 43 comprises a first port 45 with two phases, a second port 46 with three phases and a third port 47 with three phases. The first port 45 is connected to the inductive charging receiver 18, the second port 46 to the bridge circuit 41, and the third port 47 to the motor 10 from FIG. 5. Here, the voltage of the second port 46 is dependent on the current and the voltage of the two phases of the first port 45, and the voltage of the third port 47 is dependent on the current and the voltage of the three phases of the second port 46; in particular, two of the three phases of the second port 46 are identical to the phases of the first port 45, and the three phases of the third port 47 are identical to the three phases of the second port 46. The voltage of a port is thus only ever dependent on the current and the voltage of the adjacent port—this is illustrated by the depicted arrows. In the recuperation mode when the motor acts as generator (for example during the braking operation), the circuit 44 reverses the function of the three-port device 43 or the gate dependencies and thus the direction of the arrows (from the clockwise direction to the counterclockwise direction) in order to channel the generated current to the bridge circuit.

The drive torque is preferably transmitted by in each case one structural unit 15 to at least two drive axles 1, also termed drive shafts, in order to drive wheels of the motor vehicle.

Precisely one structural unit 15 is particularly preferably provided for in each case two drive axles 1.

Here, it is particularly to be preferred if, as seen with respect to the structural unit 15, the two axles 1 are arranged on opposite sides of the structural unit 15. In other words, in each case a right and a left wheel of the motor vehicle are driven and, if correspondingly integrated, also steered by the structural unit 15.

LIST OF REFERENCE SIGNS

1 Drive axle
10 First electric motor (traction motor)
11 Second electric motor (traction motor)
12 First gearing
13 Second gearing
14 Third gearing 15 Structural unit
16 Service brake system
17 Steering system
18 Charging receiver
19 Housing
20 Free
21 Free
22 Third electric motor (auxiliary electric motor for torque vectoring)
23 First service brake
24 Second service brake
25 Fourth electric motor (steering system)
26 Steering gear (steering system)
27 Power electronics unit
28 Synchronous converter
29 Shield-shaped magnetic field-guiding element (of the housing)
30 Transmitter system (with a transmitter coil)
40 Battery
41 Bridge circuit
42 Switching branch
43 Three-port device (as rotor electronics unit)
44 Direction reversal switch/controller
45 1st port (of the three-port device)
46 2nd port (of the three-port device)
47 3rd port (of the three-port device)

What is claimed is:

1. An axle drive unit for an electrically-drivable motor vehicle, the axle drive unit comprising:
   a structural unit having a housing arrangeable in a motor vehicle body and sized to accommodate an electric motor and a gearing, wherein the electric motor generates a drive torque,
   wherein the gearing transmits the drive torque to a drive axle of the motor vehicle;
   a power electronics unit integrated into the structural unit and electrically supplying the electric motor;
   an inductive charging receiver integrated into the structural unit for a battery system, wherein the power electronics unit is electrically connected to the inductive charging receiver and is configured to rectify an alternating voltage for inducement in the inductive charging receiver, and
   wherein the inductive charging receiver includes a coil disposed on a lower side of and within the housing, and wherein at least part of the lower side of the housing above which the coil is disposed is configured as a field-guiding element for magnetic alternating fields.

2. The axle drive unit of claim 1 wherein at least part of the lower side of the housing above which the coil is disposed is configured as a shield.

3. The axle drive unit of claim 1 wherein at least part of the lower side of the housing above which the coil is disposed is configured as a concave shield.

4. The axle drive unit of claim 1 wherein at least part of the lower side of the housing above which the coil is disposed comprises an aluminum alloy with a 40% by volume content of ferrite.

5. The axle drive unit of claim 1 wherein the inductive charging receiver is configured for magnetic alternating fields in a frequency range of at least 10 kHz.

6. The axle drive unit of claim 1 wherein the inductive charging receiver is configured for magnetic alternating fields in a frequency range of at least 140 kHz.

7. The axle drive unit of claim 1 wherein the electric motor and the inductive charging receiver are each liquid-cooled, the axle drive unit comprising a device for cooling liquid to be supplied to the electric motor and to the inductive charging receiver.

8. The axle drive unit of claim 7 wherein the structural unit comprises a housing, wherein the housing comprises a connection for connecting the device for cooling liquid to a cooling liquid circuit.

9. The axle drive unit of claim 1 wherein in a driving mode the power electronics unit acts as an inverter between the battery system and the electric motor, wherein in a charging mode the power electronics unit acts as a rectifier between the inductive charging receiver and the battery system.

10. The axle drive unit of claim 1 wherein the power electronics unit comprises a high-voltage/low-voltage DC/DC converter for a low-voltage supply of a vehicle on-board power supply network.

* * * * *